United States Patent
Miyake et al.

(10) Patent No.: US 11,001,686 B2
(45) Date of Patent: May 11, 2021

(54) FILLER-CONTAINING FILM

(71) Applicant: DEXERIALS CORPORATION, Tokyo (JP)

(72) Inventors: Takeshi Miyake, Oyama (JP); Shoko Kuga, Saitama (JP); Reiji Tsukao, Utsunomiya-shi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 16/344,489

(22) PCT Filed: Oct. 27, 2017

(86) PCT No.: PCT/JP2017/038851
§ 371 (c)(1),
(2) Date: Apr. 24, 2019

(87) PCT Pub. No.: WO2018/084075
PCT Pub. Date: May 11, 2018

(65) Prior Publication Data
US 2019/0256675 A1 Aug. 22, 2019

(30) Foreign Application Priority Data

Nov. 4, 2016 (JP) .............................. JP2016-216233
Aug. 22, 2017 (JP) .............................. JP2017-159647

(51) Int. Cl.
*C08J 5/18* (2006.01)
*C09J 7/38* (2018.01)
(Continued)

(52) U.S. Cl.
CPC ................ *C08J 5/18* (2013.01); *B32B 7/022* (2019.01); *B32B 27/08* (2013.01); *B32B 27/20* (2013.01);
(Continued)

(58) Field of Classification Search
CPC ...... C08J 5/18; C08J 2361/10; C08J 2363/00; C08J 2461/10; C08J 2463/00; C09J 7/38;
(Continued)

(56) References Cited

U.S. PATENT DOCUMENTS

2011/0005812 A1* 1/2011 Shimokawa ............ B32B 15/08
174/255
2014/0141195 A1* 5/2014 Liang ........................ C09J 7/20
428/98

(Continued)

FOREIGN PATENT DOCUMENTS

JP 2006-015680 A 1/2006
JP 2006-233202 A 9/2006
(Continued)

OTHER PUBLICATIONS

Jan. 23, 2018 Search Report issued in International Patent Application No. PCT/JP2017/038851.
(Continued)

*Primary Examiner* — Nathan L Van Sell
(74) *Attorney, Agent, or Firm* — Oliff PLC

(57) ABSTRACT

A filler-containing film that can be precisely pressed to an electronic component with lower thrust is a film having a filler distributed layer in which fillers are regularly disposed in a resin layer, wherein an area occupancy rate of the fillers in a plan view is 25% or less, a ratio La/D between a layer thickness La of the resin layer and a particle diameter D of the fillers is 0.3 or more and 1.3 or less, and a proportion by number of the fillers present in a non-contact state with each other is 95% or more with respect to the entire fillers. The proportion by number of the fillers present in a non-contact state with each other is preferably 99.5% or more with respect to the entire fillers.

13 Claims, 6 Drawing Sheets

(51) Int. Cl.
  *B32B 7/022* (2019.01)
  *B32B 27/08* (2006.01)
  *B32B 27/20* (2006.01)
  *C09J 5/00* (2006.01)
  *C09J 9/02* (2006.01)
  *C09J 11/04* (2006.01)
  *H01R 4/04* (2006.01)
  *C08K 9/02* (2006.01)
  *C08K 3/08* (2006.01)

(52) U.S. Cl.
  CPC . *C09J 5/00* (2013.01); *C09J 7/38* (2018.01); *C09J 9/02* (2013.01); *C09J 11/04* (2013.01); *H01R 4/04* (2013.01); *B32B 2307/202* (2013.01); *B32B 2307/206* (2013.01); *B32B 2457/00* (2013.01); *C08J 2361/10* (2013.01); *C08J 2363/00* (2013.01); *C08J 2461/10* (2013.01); *C08J 2463/00* (2013.01); *C08K 9/02* (2013.01); *C08K 2003/0831* (2013.01); *C08K 2003/0862* (2013.01); *C08K 2201/001* (2013.01); *C08K 2201/003* (2013.01); *C09J 2203/326* (2013.01); *C09J 2461/00* (2013.01); *C09J 2463/00* (2013.01)

(58) Field of Classification Search
  CPC .... C09J 2205/102; C09J 2201/61; C09J 7/10; C09J 7/22; C09J 5/00; C09J 9/02; C09J 11/04; C09J 2203/326; C09J 2461/00; C09J 2463/00; C09J 2301/408; C09J 2301/304; B32B 7/02; B32B 7/022; B32B 27/08; B32B 27/20; B32B 2307/202; B32B 2307/206; B32B 2457/00; B32B 17/064; B32B 2264/0214; B32B 2264/0235; B32B 27/32; B32B 27/42; B32B 27/34; B32B 27/308; B32B 27/281; B32B 3/30; B32B 9/045; B32B 27/38; B32B 7/027; B32B 27/36; B32B 27/40; B32B 2250/03; B32B 2264/107; B32B 2264/12; B32B 2457/08; B32B 2307/536; B32B 2264/025; B32B 2264/102; B32B 2307/706; B32B 2264/0207; B32B 2270/00; B32B 2250/24; B32B 2264/10; B32B 2264/105; B32B 2307/408; B32B 2250/02; B32B 2307/732; B32B 9/005; C08K 7/00; C08K 3/013; C08K 9/02; C08K 2003/0831; C08K 2003/0862; C08K 2201/001; C08K 2201/003; H01R 11/01; H01R 4/04; H01B 5/16
  See application file for complete search history.

(56) References Cited

U.S. PATENT DOCUMENTS

| | | | |
|---|---|---|---|
| 2014/0312501 A1* | 10/2014 | Liang | B32B 27/38 257/773 |
| 2015/0240130 A1* | 8/2015 | Liang | C09J 9/02 428/206 |
| 2016/0270225 A1 | 9/2016 | Shinohara | |
| 2017/0323701 A1 | 11/2017 | Ishimatsu et al. | |

FOREIGN PATENT DOCUMENTS

| | | |
|---|---|---|
| JP | 2009-074020 A | 4/2009 |
| JP | 2010-033793 A | 2/2010 |
| JP | 2010-067360 A | 3/2010 |
| JP | 4887700 B2 | 2/2012 |
| JP | 2013-103368 A | 5/2013 |
| JP | 2014-060150 A | 4/2014 |
| JP | 2014-183266 A | 9/2014 |
| JP | 2015-138904 A | 7/2015 |
| JP | 2015-167106 A | 9/2015 |
| JP | 2016-092004 A | 5/2016 |
| JP | 2016-131152 A | 7/2016 |
| JP | 6187665 B1 | 8/2017 |
| KR | 10-2011-0137158 A | 12/2011 |
| WO | 2015/076234 A1 | 5/2015 |
| WO | 2016/002336 A1 | 1/2016 |
| WO | 2016/068168 A1 | 5/2016 |

OTHER PUBLICATIONS

Jan. 23, 2018 Written Opinion issued in International Patent Application No. PCT/JP2017/038851.
Nov. 28, 2018 International Preliminary Report on Patentability issued in International Application No. PCT/JP2017/038851.
Nov. 28, 2020 Office Action issued in Korean Patent Application No. 10-2019-7010975.

* cited by examiner (X-X cross-sectional view)

10A

10B

10C

10D

10E

10F

FILLER-CONTAINING FILM

TECHNICAL FIELD

The present invention relates to a filler-containing film such as an anisotropic conductive film.

BACKGROUND ART

Films containing fillers dispersed in a resin layer have been used in a wide variety of use applications such as matte films, capacitor films, optical films, labeling films, antistatic films, and anisotropic conductive films (Patent Literature 1, Patent Literature 2, Patent Literature 3, and Patent Literature 4).

For example, when anisotropic conductive connection using an anisotropic conductive film which is one aspect of a filler-containing film is performed, it has been proposed to arrange conductive particles in a specific arrangement in an anisotropic conductive film in order to suppress variation in the number of conductive particles captured by a terminal (Patent Literature 5), and also to set the number of conductive particles separated from one another in an anisotropic conductive film to a predetermined ratio or more in order to simultaneously achieve the ensuring of connection reliability of opposing terminals and suppressing of short circuit between adjacent terminals (Patent Literature 6).

CITATION LIST

Patent Literature

Patent Literature 1: Japanese Patent Application Laid-Open No. 2006-15680
Patent Literature 2: Japanese Patent Application Laid-Open No. 2015-138904
Patent Literature 3: Japanese Patent Application Laid-Open No. 2013-103368
Patent Literature 4: Japanese Patent Application Laid-Open No. 2014-183266
Patent Literature 5: Japanese Patent No. 4887700
Patent Literature 6: Japanese Patent Application Laid-Open No. 2015-167106

SUMMARY OF INVENTION

Technical Problem

However, when thermocompression bonding of an anisotropic conductive film to an electronic component using a pressing jig is conventionally performed, the relationship between the density of number of conductive particles to be contained in the anisotropic conductive film and the thrust required for the pressing jig has not been examined in detail, yet.

Therefore, even if the density of number of the conductive particles in the anisotropic conductive film is determined from the viewpoint of ensuring of the connection reliability of the terminal and suppressing of short circuit, when the anisotropic conductive film is actually set in the pressing jig to perform thermocompression bonding for anisotropic conductive connection, the thrust required for the pressing jig to press the conductive particles into the terminal is increased. In some cases, it is impossible to cope with the conventional pressing jig, and in this case, if the pressing jig is modified or the like, there is a concern that the cost is increased.

On the other hand, an object of the present invention is to enhance, when the filler-containing film is connected to an article, for example, when an electronic component is connected using an anisotropic conductive film, the conductive particle capturing properties at the terminal to thereby improve the conduction characteristics, and prevent the thrust required by the pressing jig for pressing the filler-containing film such as the anisotropic conductive film against the electronic component from becoming excessively high. Further, it is another object to enable the control of the characteristics of the filler-containing film by using the relationship between the particle diameter of the fillers in the filler-containing film and the thickness of the layer holding the fillers as an index (the problem of the thrust required for the pressing jig in the anisotropic conductive film described above is one example).

Solution to Problem

The present inventors have found that the characteristics of a filler-containing film can be adjusted by setting the ratio between the particle diameter of the fillers and the thickness of a layer holding the fillers in a specific range when the filler-containing film is pressure-bonded to an article, by regularly dispersing the filler, by increasing the proportion by number of the fillers present in a non-contact state with each other, by adjusting the area occupancy rate of the fillers, and the like, thereby completing the present invention. As specifically explaining the present invention while using an anisotropic conductive film as an example, the present inventors have found that in order to enhance the properties of capturing the fillers such as conductive particles at terminals and reduce the thrust required for a pressing jig when thermocompression bonding of an anisotropic conductive film to an electronic component is performed, it is effective to regularly disperse the fillers such as conductive particles in a resin layer (preferably an insulating resin layer) to increase the proportion by number of the fillers such as conductive particles present in a non-contact state with each other, to set the ratio between the thickness of the resin layer and the average particle diameter of the fillers in a specific range, and to adjust the area occupancy rate of the fillers in a filler-containing film such as an anisotropic conductive film, thereby completing the present invention.

That is, the present invention provides a filler-containing film having a filler distributed layer in which fillers are regularly disposed in a resin layer. In the filler-containing film,
an area occupancy rate of the fillers in a plan view is 25% or less,
a ratio La/D between a layer thickness La of the resin layer and a particle diameter D of the fillers is 0.3 or more and 1.3 or less, and
a proportion by number of the fillers present in a non-contact state with each other is 95% or more with respect to the entire fillers. In particular, the present invention provides a filler-containing film used as an anisotropic conductive film in which the fillers are conductive particles and the resin layer of the filler distributed layer is an insulating resin layer, as a preferable aspect of the filler-containing film.

The present invention also provides a film bonded body in which the above-mentioned filler-containing film is bonded to an article, a connection structure in which a first article and a second article are connected via the above-mentioned filler-containing film, and in particular, a connection structure in which a first electronic component and a second electronic component are anisotropically conductively connected via the filler-containing film used as an anisotropic conductive film. Further, the present invention provides a method for producing a connection structure including pressure bonding a first article and a second article via the above-mentioned filler-containing film, and a method for producing a connection structure in which a first electronic component and a second electronic component are adopted as the first article and the second article, respectively, and a connection structure in which the first electronic component and the second electronic component are anisotropically conductively connected to each other is produced by thermocompression bonding the first electronic component and the second electronic component via the filler-containing film used as an anisotropic conductive film.

Advantageous Effects of Invention

According to the filler-containing film (an anisotropic conductive film which is one aspect thereof) of the present invention, fillers such as conductive particles are regularly distributed in a resin layer (preferably, an insulating resin layer) and a proportion by number of the fillers present in a non-contact state with each other with respect to the entire fillers is 95% or more. Thus, the respective fillers are uniformly pressed when the filler-containing film such as an anisotropic conductive film is thermocompression bonded to an electronic component. Furthermore, since the ratio La/D between the layer thickness La of the resin layer and the average particle diameter D of the fillers is 0.3 or more and 1.3 or less, positional displacement of the fillers hardly occurs when the filler-containing film such as an anisotropic conductive film is thermocompression bonded to the electronic component. Therefore, the arrangement and dispersion state of the fillers at the pressure-bonded portion can be maintained in a state before the pressure-bonded state. Thus, the fillers of the anisotropic conductive film are easily captured by the terminal. The same tendency can be obtained for connections other than the anisotropic conductive film.

Further, according to the filler-containing film (an anisotropic conductive film which is one aspect thereof) of the present invention, since the area occupancy rate of the fillers such as the conductive particles is 25% or less, it is possible to ensure that the fillers are pressed against the article (electronic component) at a low pressure. Thus, it is possible to prevent the thrust required for a pressing jig from becoming excessively high when the filler-containing film such as the anisotropic conductive film is pressure bonded to the electronic component. Further, there is an optical film as another aspect, for example, and the optical performance of the fillers can be adjusted by adjusting the proportion by number of the fillers independently in a non-contact state with each other in the thickness direction in the resin layer and in a plan view. The same can be applied to a matte film or the like which is directly related to the appearance.

DESCRIPTION OF EMBODIMENTS

Figure 1A:
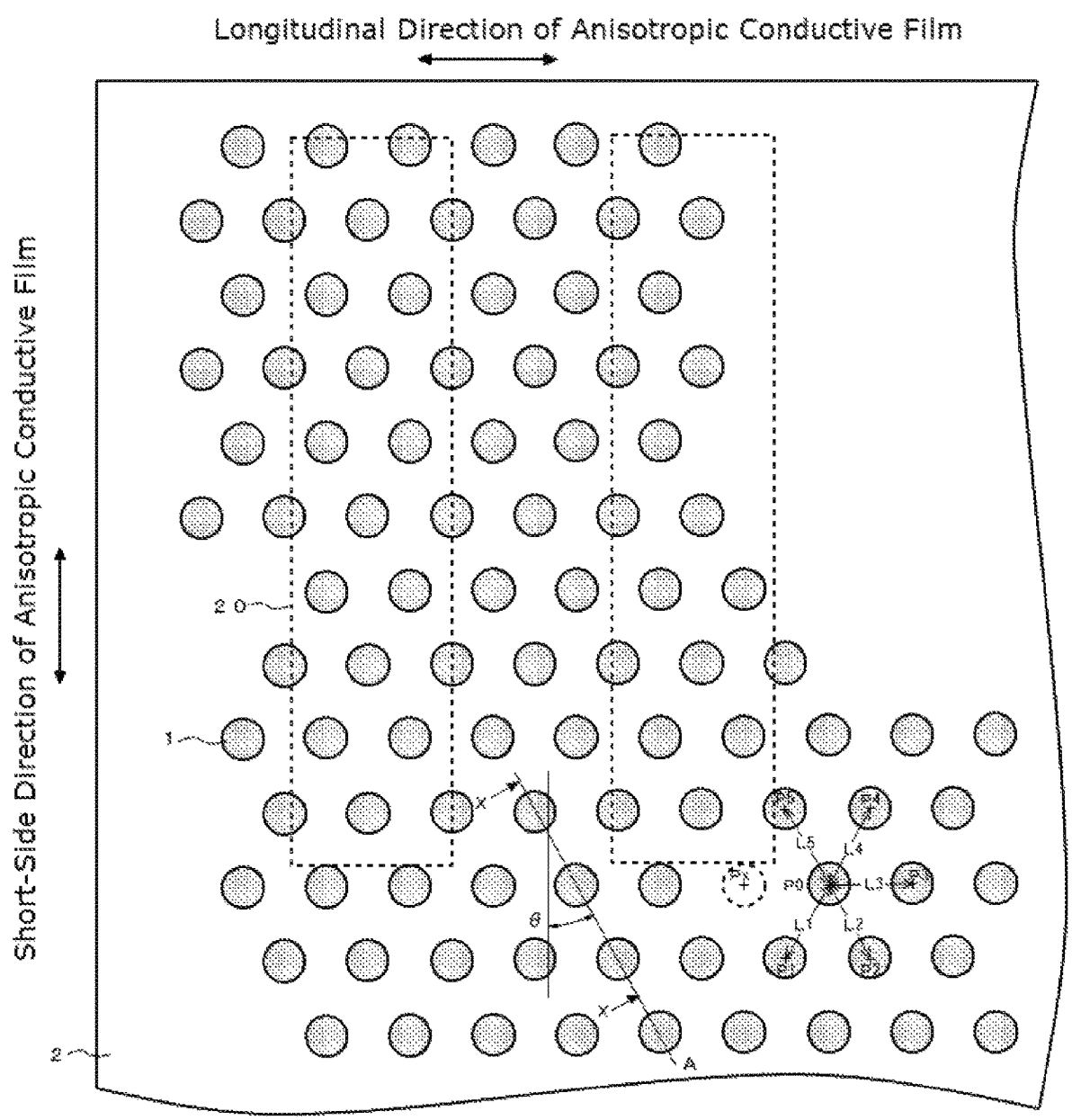
FIG. 1A is a plan view showing a disposition of fillers (conductive particles) in a filler-containing film (an anisotropic conductive film which is one aspect thereof) 10A of an embodiment.
Figure 1B:
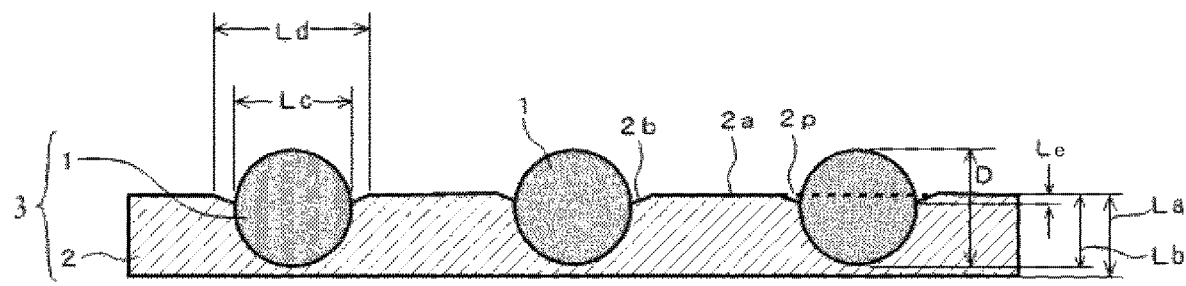
FIG. 1B is a cross-sectional view of the filler-containing film (an anisotropic conductive film which is one aspect thereof) 10A of the embodiment.

An anisotropic conductive film which is one aspect of the filler-containing film of the present invention will be mainly described below in detail with reference to the drawings. Note that the same reference numerals in the drawings denote the same or equivalent components.
<Overall Configuration of Filler-Containing Film>
FIG. 1A is a plan view for describing a disposition of fillers (or conductive particles) 1 in a filler-containing film (an anisotropic conductive film which is one aspect thereof) 10A of the present invention. In addition, FIG. 1B is an X-X cross-sectional view of the filler-containing film 10A.

In a filler distributed layer (or conductive particle distributed layer) 3 of the filler-containing film 10A, the fillers 1 are distributed in a regular arrangement state on one surface of the resin layer 2 (or insulating resin layer) formed of a resin having a relatively high minimum melt viscosity.
<Filler>
The filler 1 is appropriately selected according to use applications of the filler-containing film as well as according to the performance required for the use application such as hardness and optical performance from known inorganic fillers (metal, metal oxide, metal nitride, etc.), organic fillers (resin particles, rubber particles, etc.), and fillers in which an organic material and an inorganic material are mixed (for example, particles in which a core is formed of a resin material and the surface thereof is metal-plated (metal-coated resin particles), particles in which insulating fine particles are adhered to the surface of conductive particles, surfaces of conductive particles are insulated, etc.). For example, in the case of an optical film or a matte film, a silica filler, a titanium oxide filler, a styrene filler, an acrylic filler, a melamine filler, various titanates, or the like can be used. In the case of a capacitor film, titanium oxide, magnesium titanate, zinc titanate, bismuth titanate, lanthanum oxide, calcium titanate, strontium titanate, barium titanate, barium zirconate titanate, lead zirconate titanate, mixtures thereof, or the like can be used. In the case of an adhesive film, polymer-based rubber particles, silicone rubber particles, or the like can be contained. In the case of an anisotropic conductive film, conductive particles are contained.

Examples of the conductive particles may include metal particles of nickel, cobalt, silver, copper, gold, palladium, and the like, alloy particles of solder and the like, metal-coated resin particles, and metal-coated resin particles having insulating fine particles adhered to the surface thereof. Two or more types may be used in combination. Among these, the metal-coated resin particles are preferable from the viewpoint that the contact with the terminal is easily maintained by repulsion of the resin particles after the metal-coated resin particles are connected, and that the conduction performance is stabilized. Further, the surface of the conductive particles may be subjected to an insulating treatment, which does not hinder the conduction characteristics, by a known technique. The fillers mentioned above for each use application are not limited to the particular use application, and may be contained in filler-containing films for other use applications as necessary. In addition, in the filler-containing film for each use application, two or more kinds of fillers can be used in combination as necessary.

The shape of the filler is appropriately selected and determined from a spherical shape, an elliptical sphere, a columnar shape, a needle shape, a combination thereof, and the like according to the use application of the filler-containing film. A spherical shape is preferable from the viewpoint of facilitating confirmation of the filler disposition and maintaining the uniform state. In particular, when the filler-containing film is configured as an anisotropic conductive film, it is preferable that the conductive particles which are fillers be substantially perfect spheres. For example, in producing an anisotropic conductive film in which conductive particles are arranged using a transfer mold as described in Japanese Patent Application Laid-Open No. 2014-60150, when conductive particles having a substantially perfect sphere are used as the conductive particles, the conductive particles roll smoothly on the transfer mold, so that the conductive particles can be filled in predetermined positions on the transfer mold with high precision. Therefore, the conductive particles can be precisely disposed.

In order to cope with variations in wiring height, to suppress an increase in conduction resistance, and to suppress short circuit, the particle diameter D of the fillers 1 is preferably 1 μm or more and 30 μm or less, and more preferably 3 μm or more and 9 μm or less. The particle diameter of the fillers before being distributed in the resin layer 2 can be measured by a general particle size distribution measuring apparatus, and the average particle diameter can also be determined using a particle size distribution measuring apparatus. FPIA-3000 (Malvern Panalytical Ltd.) may be mentioned as one example of the measuring apparatus. The particle diameter D of the fillers such as conductive particles in a filler-containing film such as an anisotropic conductive film can be determined from observation with an electron microscope such as SEM. In this case, it is desirable to set the number of samples for measuring the particle diameter D of the fillers to 200 or more. When the shape of the filler is not spherical, the maximum length or the diameter of the shape simulating a spherical shape based on a planar image or a cross-sectional image of the filler-containing film can be used as the particle diameter D of the fillers.

<Filler Arrangement>

In the filler-containing film of the present invention (anisotropic conductive film which is one aspect thereof), the fillers 1 such as conductive particles are regularly disposed rather than randomly in a plan view. It is preferable that the fillers 1 be present while being not in contact with each other in a plan view of the film, and that the fillers 1 be present while not overlapping each other in a film thickness direction. Therefore, the proportion by number of the fillers 1 present in a non-contact state with each other with respect to the entire fillers is 95% or more, preferably 98% or more, and more preferably 99.5% or more. In addition, it is preferable that the positions of the fillers 1 in the film thickness direction be also aligned. For example, as shown in FIG. 1A, the fillers 1 are arranged in a hexagonal lattice arrangement, and the embedded amounts Lb of the fillers 1 in the film thickness directions can be made uniform as will be described later. In the dispersion state in which the proportion by number of the fillers present in a non-contact state with each other is 95% or more, there may be a portion Px in which the filler is omitted with respect to the predetermined regular disposition of the fillers (FIG. 1A). The omission of the filler can be confirmed by regularly existing in a predetermined direction of the film within a range in which the characteristics are acceptable. Also, by repeatedly causing the filler to be omitted in the longitudinal direction of the film, or by gradually increasing or decreasing the portion where the filler is omitted in the longitudinal direction of the film, lot management becomes possible. Furthermore, traceability (property that enables tracing) can be imparted to the filler-containing film and the connection structure using the same. This is also effective for preventing counterfeiting, authenticity determination, and unauthorized use of a filler-containing film or a connection structure using the same.

In addition, as aspects of regular dispositions of the fillers, lattice arrangements such as a rectangular lattice, a rhombic lattice, a square lattice, or other rectangular lattices can be mentioned. Alternatively, particle rows in which fillers are linearly arranged at predetermined intervals may be arranged in parallel at predetermined intervals. The regular disposition is not particularly limited as long as it is repeated in the longitudinal direction of the film. Among these regular dispositions, if the fillers are disposed in a hexagonal lattice, a square lattice or a rhombic lattice (i.e., a diamond lattice), when three fillers P1, P2, and P3 are selected in order of proximity to any filler P0, it is preferable that the ratio (Lmax/Lmin) of the maximum distance (Lmax) to the minimum distance (Lmin) among the distances L1, L2, and L3 between the three fillers P1, P2, and P3 and the filler P0 be 1 or more and 1.2 or less, more preferably 1.1 or less, and further more preferably 1.05 or less (FIG. 1A). In particular, if the fillers are arranged in a hexagonal lattice, when the ratio (Lmax/Lmin) between the largest distance (Lmax) and the smallest distance (Lmin) is determined by selecting five fillers P1, P2, P3, P4, and P5 in the order in which the distance to an arbitrary filler P0 is short in the same manner as described above, it is preferable that the ratio be 1 or more and 1.1 or less. If the filler is disposed in a hexagonal lattice, a square lattice or a rhombic lattice (diamond lattice), the ratio (Lmax/Lmin) between the largest distance and the smallest distance is 1 in terms of design. In reality, however, a slight positional displacement occurs when a filler-containing film such as an anisotropic conductive film is produced. Furthermore, when the filler-containing film is provided as a wound body, there is a concern that a slight positional displacement occurs even by tightening during winding depending on the thickness of the filler-containing film. Therefore, the upper limit of the above-mentioned ratio (Lmax/Lmin) is an allowable range of positional displacement of the fillers in the present invention. In the present invention, suppressing the allowable range to a low level allows the fillers to be disposed in a non-contact state with each other and evenly with respect to each other. Therefore, when the filler-containing film is configured as an anisotropic conductive film, pressure can be uniformly applied to the conductive particles which are the fillers 1 at the time of anisotropic conductive connection, thereby practically reducing variation in conduction resistance. As a method for disposing the fillers while suppressing the slight positional displacement as described above, it is preferable to prepare a mold in which portions where the fillers are to be disposed are defined in advance when a filler-containing film such as an anisotropic conductive film as described later is produced, dispose the fillers in the portions, and transfer the fillers to the resin layer.

In the present invention, when there is a lattice axis or an arrangement axis in the arrangement of the fillers 1, the lattice axis or arrangement axis may be parallel to the longitudinal direction of the filler-containing film or may intersect with the longitudinal direction of the filler-containing film. In the case where the filler-containing film is an anisotropic conductive film, for example, it can be determined according to a width of the terminal to be connected, a terminal pitch, and the like. In the case where the filler-containing film is an anisotropic conductive film for fine pitches, for example, it is preferable to incline at least one lattice axis A of the fillers 1 with respect to the longitudinal direction of the filler-containing film 10A as shown in FIG. 1A, and to make the angle θ formed between the longitudinal direction of the terminal 20 connected by the filler-containing film 10A and the lattice axis A be 16° to 74°. Even in use applications other than the anisotropic conductive film, the effect of stabilizing the captured state is expected by inclining in this manner.

In the present invention, the inter-particle distance of the fillers 1 such as the conductive particles is set so that the area occupancy rate of the fillers 1 in the filler-containing film such as the anisotropic conductive film is 25% or less, preferably 0.5% or more and 23% or less, and more preferably 1.4% or more and less than 20%, as described later. The density of number of fillers is preferably set to be 30 to 32000 fillers/mm$^2$.

That is, the inter-particle distance of the fillers 1 is determined as appropriate according to the size and the terminal pitch of the terminals to be connected by the filler-containing film as long as the area occupancy rate is 25% or less. For example, when the filler-containing film is configured as an anisotropic conductive film, and when the anisotropic conductive film is made to correspond to COGs (Chip On Glass) of fine pitches, it is preferable to set the distance between the nearest particles to greater than or equal to 0.5 times, more preferably to greater than 0.7 times, the particle diameter D of the fillers from the viewpoint of suppressing short circuit. On the other hand, from the viewpoint of the properties of capturing the fillers 1, it is preferable to set the distance between the nearest particles to smaller than or equal to four times, more preferably to smaller than or equal to three times the particle diameter D of the fillers. Further, from the viewpoint of stabilizing the suppression of short circuit, it is preferable to set the nearest distance between the fillers to 0.5 μm or more regardless of the particle diameter of the filler.

<Density of Number of Fillers>

In the present invention, the density of number of fillers can be determined by arbitrarily setting a plurality of rectangular areas (5 or more, preferably 10 or more) each having a side of 100 μm or more, and setting the total area of the measured areas to 2 mm$^2$ or more. The size and number of the individual regions may be appropriately adjusted according to the state of the density of number. As an example of the case where the density of number is relatively large for the fine pitch application, the density of number can be obtained by measuring the density of number using an observation image by a metallurgical microscope or the like for 200 regions each having an area of 100 μm×100 μm arbitrarily selected from the filler-containing film 10A, and averaging the densities. The region with an area of 100 μm×100 μm corresponds to a region in which one or more bumps are present in a connection object having an inter-bump space of 50 μm or less.

The densities of number of fillers such as conductive particles may be obtained by observing using a metallurgical microscope as described above, or may be obtained by measurement of an observed image by an image analysis software (for example, WinROOF, available from Mitani Corporation) or the like.

In the anisotropic conductive film which is one aspect of the filler-containing film, the density of number of fillers such as conductive particles is set according to the particle diameter, hardness, and the like of the fillers as long as the area occupancy rate of the fillers is 25% or less. That is, in the case of the anisotropic conductive film, if the density of number of fillers is too small, it is impossible to cope with the connection of electronic components with fine pitches whereas, if the density of number is too large, short circuit occurs. Thus, in the case of the anisotropic conductive film having a particle diameter of 1 to 30 μm, the density of number is preferably 30 to 32000 particles/mm$^2$, and more preferably 280 to 28000 particles/mm$^2$.

<Area Occupancy Rate of Fillers>

In the anisotropic conductive film which is one aspect of the filler-containing film of the present invention, the area occupancy rate of the fillers such as conductive particles is 25% or less, preferably 23% or less, and more preferably less than 20% from the viewpoint of preventing the thrust required for a pressing jig at the time of anisotropic conductive connection or the like from becoming excessively large. In addition, 0.5% or more is preferable, 1% or more is more preferable, and 2% or more is further more preferable, from the viewpoint of ensuring the conduction reliability. The area occupancy rate of the fillers is calculated by "=[density of number of fillers in a plan view]×[average area of one filler in a plan view]×100." The area occupancy rate of the filler-containing film may be appropriately selected according to its use application, and there is no limitation as long as it does not cause a problem in production. However, the same range as described above is preferable because it can be said that the above-described stability can be obtained in connection other than anisotropic conductive connection.

In the formula, the density of number of the fillers is determined by the above-mentioned method, and the average of the area of one filler in a plan view is determined by measurement from an observation image of the film surface by a metallurgical microscope or the like. The above-mentioned image analysis software (WinROOF, available from Mitani Corporation) or the like may be used.

In the present invention, in the anisotropic conductive film which is one aspect of the filler-containing film, the area occupancy rate of the fillers serves as an index of the thrust required for the pressing jig at the time of thermocompression bonding to the electronic component, and the particle diameter of the filler, the density of number of the fillers, and the like are set so that the area occupancy rate of the fillers becomes 25% or less. Conventionally, the inter-particle distance and density of number of the fillers have been determined according to the terminal width and inter-terminal distance of the electronic component, the particle diameter of the fillers, the arrangement of the fillers, and the like. In the present invention, however, the inter-particle distance and the density of number of fillers are determined so that the area occupancy rate of the fillers becomes 25% or less. This eliminates the need for excessively high thrust when the anisotropic conductive film is pressure bonded to the electronic component. Examples of another aspect include an optical film. The optical performance of the fillers can be adjusted by adjusting the area occupancy rate of the fillers as described above. The same can be applied to a matte film or the like which is directly related to the appearance.

<Resin Layer>

(Viscosity of Resin Layer)

The minimum melt viscosity of the resin layer 2 is not particularly limited, and can be appropriately determined according to the use application of the filler-containing film, the production method of the filler-containing film, and the like. For example, the minimum melt viscosity can be set to about 1000 Pa·s depending on the production method of the filler-containing films as long as the concaves 2b and 2c described later can be formed. On the other hand, when a method of holding the fillers in a predetermined disposition on the surface of the resin layer and pushing the fillers into the resin layer is performed as a production method of the filler-containing film, it is preferable to set the minimum melt viscosity of the resin layer to 1100 Pa·s or more from the viewpoint that the resin layer enables film molding.

Figure 6:
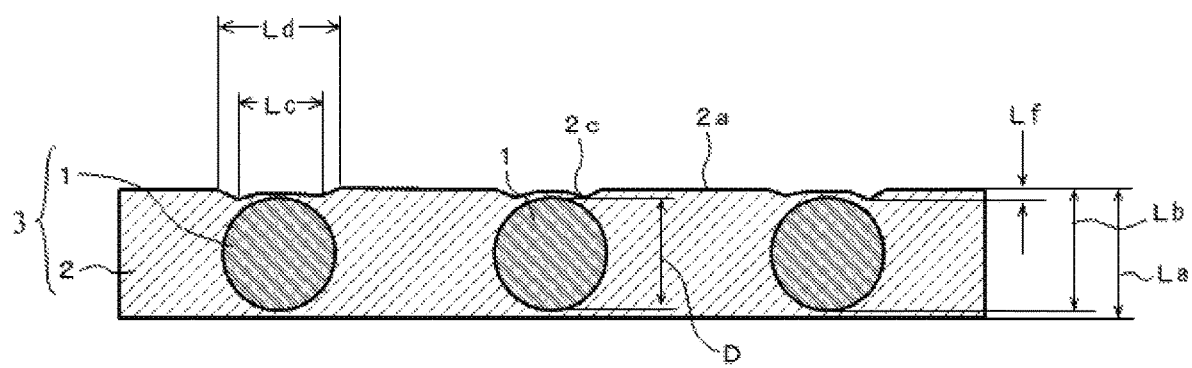
FIG. 6 is a cross-sectional view of a filler-containing film (an anisotropic conductive film which is one aspect thereof) 10F of an embodiment.

In addition, as will be described later in the method for producing the filler-containing film, the minimum melt viscosity is preferably 1500 Pa·s or more, more preferably 2000 Pa·s or more, further preferably 3000 to 15000 Pa·s, and further more preferably 3000 to 10000 Pa·s, in terms of forming a concave 2b around the exposed part of the filler 1 pushed into the resin layer 2 as shown in FIG. 1B and forming a concave 2c on the surface of the resin layer 2 immediately above the filler 1 pushed into the resin layer 2 as shown in FIG. 6. The minimum melt viscosity can be determined by using, for example, a rotary rheometer (manufactured by TA Instruments), maintaining the measurement pressure being constant at 5 g, and using a measurement plate having a diameter of 8 mm. More specifically, it can be determined by setting the rate of temperature increase to 10° C./min, the measurement frequency to 10 Hz, and the load variation to 5 g with respect to the measurement plate in a temperature range of 30 to 200° C.

When the minimum melt viscosity of the resin layer 2 is set to a high viscosity of 1500 Pa·s or more, unnecessary movement of the fillers at the time of pressure bonding of the filler-containing film to the article can be suppressed. In particular, in the case where the filler-containing film is an anisotropic conductive film, it is possible to prevent the conductive particles to be held between the terminals at the time of anisotropic conductive connection from flowing by the resin flow.

In addition, when the filler distributed layer 3 of the filler-containing film 10A is formed by pushing the fillers 1 into the resin layer 2, the resin layer 2 at the time of pushing the fillers 1 thereinto is a viscous member having a high viscosity such that the resin layer 2 is plastically deformed to form a concave 2b (FIG. 1B) in the resin layer 2 around the filler 1 when the fillers 1 are pushed into the resin layer 2 so as to be exposed from the resin layer 2, or is a viscous member having a high viscosity such that a concave 2c (FIG. 6) is formed on the surface of the resin layer 2 immediately above the filler 1 when the fillers 1 are pushed into the resin layer 2 to be embedded without being exposed from the resin layer 2. Therefore, the lower limit of the viscosity of the resin layer 2 at 60° C. is preferably 3000 Pa·s or more, more preferably 4000 Pa·s or more, and further preferably 4500 Pa·s or more, and the upper limit thereof is preferably 20000 Pa·s or less, more preferably 15000 Pa·s or less, and further preferably 10000 Pa·s or less. This measurement is performed by the same measurement method as that for the minimum melt viscosity, and the viscosity can be determined by extracting a value at a temperature of 60° C.

The specific viscosity of the resin layer 2 at the time of pushing the fillers 1 thereinto is determined according to the shape and depth of the concave 2b or 2c, or the like, and the lower limit thereof is preferably 3000 Pa·s or more, more preferably 4000 Pa·s or more, and further preferably 4500 Pa·s or more, and the upper limit thereof is preferably 20000 Pa·s or less, more preferably 15000 Pa·s or less, and further preferably 10000 Pa·s or less. Such a viscosity is preferably obtained at 40 to 80° C., more preferably at 50 to 60° C.

As described above, the formation of the concave 2b (FIG. 1B) around the filler 1 exposed from the resin layer 2 reduces the resistance received from the resin due to the flattening of the fillers 1 that occurs when the filler-containing film is pressure bonded to an article, compared to the absence of a concave 2b. Therefore, in the case where the filler-containing film is an anisotropic conductive film, the conductive particles are easily held by the terminals at the time of anisotropic conductive connection, so that the conduction performance and also the capturing properties are improved.

In addition, since the concave 2c (FIG. 6) is formed on the surface of the resin layer 2 immediately above the filler 1 which is embedded without being exposed from the resin layer 2, the pressure at the time of pressure bonding of the filler-containing film to an article tends to concentrate on the filler 1 compared to the absence of a concave 2c. Therefore, in the case where the filler-containing film is an anisotropic conductive film, the conductive particles are easily held by the terminals at the time of anisotropic conductive connection, so that the capturing properties are improved and the conduction performance is improved. Such an improvement in the capturing properties is not limited to the case of the anisotropic conductive film, and the same effect can be expected for the filler-containing film other than the anisotropic conductive film.

<"Inclination" or "Undulation" Instead of Concave>

The "concave" 2b and 2c of the filler-containing film (anisotropic conductive film which is one aspect thereof) as shown in FIG. 1B and FIG. 6 can also be described in terms of "inclination" or "undulation." A description thereof will next be given with reference to the drawings.

The filler-containing film (anisotropic conductive film which is one aspect thereof) 10A is composed of a filler distributed layer 3 (FIG. 1B). In the filler distributed layer 3, the fillers 1 are regularly distributed in a state where they are exposed from one surface of the resin layer 2. In a plan view of the film, the fillers 1 are not in contact with each other, and are regularly distributed without overlapping each other also in the film thickness direction, so that they constitute a single filler layer in which the positions of the fillers 1 in the film thickness direction are aligned.

An inclination 2b is formed on the surface 2a of the resin layer 2 around each filler 1 with respect to the tangent plane 2p to a central portion of the resin layer 2 surface between adjacent fillers. As will be described later, in the filler-containing film of the present invention, an undulation 2c may be formed on the surface of the resin layer immediately above the filler 1 embedded in the resin layer 2 (FIG. 6).

The term "inclination" used in the present invention means a state in which the flatness of the surface of the resin layer is impaired in the vicinity of the filler 1, and a part of the resin layer is lacked with respect to the tangent plane 2*p* to reduce the resin amount thereby. In other words, the surface of the resin layer around the filler in the inclination is lacked with respect to the tangent plane. On the other hand, the term "undulation" used herein means a state in which a waviness is generated on the surface of the resin layer immediately above the filler, and the resin is reduced by the presence of a portion with a height difference such as a waviness. In other words, the amount of the resin in the resin layer immediately above the filler is smaller than that when the surface of the resin layer immediately above the filler is flush with a tangent plane. These can be seen by comparing the portions of the flat surfaces between the fillers with the portions corresponding to the position directly above the fillers (FIG. 1B and FIG. 6). It should be noted that the starting point of the undulation may be present as an inclination.

As described above, when the filler-containing film is configured as an anisotropic conductive film, the formation of the inclination 2*b* (FIG. 1B) around the filler 1 exposed from the resin layer 2 reduces the resistance received from the resin due to the flattening of the filler 1 that occurs when the filler 1 is held between the terminals at the time of anisotropic conductive connection, compared to the absence of an inclination 2*b*. Thus, since the fillers are easily held by the terminals, the conduction performance and also the capturing properties are improved. The inclination preferably follows the contour of the filler. This is because, in addition to the fact that the effect in connection is more likely to be exhibited, it becomes easier to carry out a test or the like in the production of the filler-containing film such as the anisotropic conductive film or the like by making it easier to recognize the fillers. The inclination and undulation may be partially lost by heat pressing the resin layer, but the present invention encompasses this case. In this case, the filler may be exposed at one point on the surface of the resin layer. When the filler-containing film is configured as an anisotropic conductive film, there are various electronic components to be connected, and as long as tuning is performed according to these, it is desired that the degree of freedom of design be high so as to satisfy various requirements. Therefore, the filler-containing film can be used even if the inclination or undulation is reduced or partially disappeared.

In addition, since the undulation 2*c* (FIG. 6) is formed on the surface of the resin layer 2 immediately above the filler 1 which is embedded without being exposed from the resin layer 2, when the filler-containing film is configured as an anisotropic conductive film, the pressing force from the terminal tends to be applied to the filler at the time of the anisotropic conductive connection, similarly to the case of the inclination. In addition, since the amount of the resin immediately above the filler is reduced due to the presence of the undulation compared with the case where the resin is deposited flat, the resin immediately above the filler is easily removed at the time of connection, and the terminal and the filler easily come into contact with each other, so that the filler capturing properties at the terminal are improved, and the conduction performance such as the conduction reliability is improved.

From the viewpoint of facilitating obtaining of the effects of the inclination 2*b* (FIG. 1B) of the resin layer 2 around the exposed portions of the filler and the undulation 2*c* (FIG. 6) of the resin layer immediately above the filler, the ratio (Le/D) of the maximum depth Le of the inclination 2*b* to the particle diameter D of the fillers 1 is preferably less than 50%, more preferably less than 30%, and more preferably 20% to 25%, the ratio (Ld/D) of the maximum diameter Ld of the inclination 2*b* or the undulation 2*c* to the particle diameter D of the fillers 1 is preferably 100% or more, and more preferably 100% to 150%, and the ratio (Lf/D) of the maximum depth Lf of the undulation 2*c* to the particle diameter D of the fillers 1 is greater than 0, preferably less than 10%, and more preferably 5% or less.

The diameter Lc of the exposed (immediately above) part of the filler 1 at the inclination 2*b* or the undulation 2*c* can be smaller than or equal to the particle diameter D of the fillers 1, and is preferably 10 to 90% of the particle diameter D. In addition, the top portion of the filler 1 may be exposed at one point, and the portion of the particle diameter D may be completely embedded in the resin layer 2 so that the diameter Lc is zero.

In the present invention described above, the presence of the inclination 2*b* and the undulation 2*c* on the surface of the resin layer 2 can be confirmed by observing a cross section of a filler-containing film such as an anisotropic conductive film with a scanning electron microscope, and can also be confirmed by surface field observation. The inclination 2*b* and the undulation 2*c* can also be observed by an optical microscope or a metallurgical microscope. Further, the size of the inclination 2*b* and the undulation 2*c* can be confirmed by adjusting the focus at the time of observing images. The same operation can be applied to the cases even after the inclination or undulation is reduced by the heat press as described above. This is because traces may remain.

(Composition of Resin Layer)

The resin layer 2 may be conductive or insulative and may be plastic or curable depending on the use application of the filler-containing film. However, the resin layer 2 may preferably be formed from an insulating curable resin composition, for example, an insulating thermo-polymerizable composition containing a thermo-polymerizable compound and a thermal polymerization initiator. The thermo-polymerizable composition may contain a photopolymerization initiator as necessary. Examples of articles formed from the insulating curable resin composition may include an anisotropic conductive film.

When a thermal polymerization initiator and a photopolymerization initiator are used in combination, a thermo-polymerizable compound which also functions as a photo-polymerizable compound may be used as the thermo-polymerizable compound, or a photopolymerizable compound may be contained separately from the thermo-polymerizable compound. A photopolymerizable compound is preferably contained separately from the thermo-polymerizable compound. For example, a thermal cationic curing initiator is used as the thermal polymerization initiator, an epoxy resin is used as the thermo-polymerizable compound, a photoradical polymerization initiator is used as the photopolymerization initiator, and an acrylate compound is used as the photopolymerizable compound.

As the photopolymerization initiator, a plurality of kinds which react with light having different wavelengths may be contained. As a result, it is possible to selectively use wavelengths used for primary light curing of the resin constituting the resin layer and for secondary light curing of the resin for bonding the electronic components to each other at the time of anisotropic conductive connection in producing the filler-containing film such as the anisotropic conductive film. The filler-containing film may be applied to use applications other than the anisotropic conductive film.

In the photocuring at the time of producing the anisotropic conductive film, all or part of the photopolymerizable compound contained in the insulating resin layer can be photocured. By this photocuring, the disposition of the conductive particles 1 in the insulating resin layer 2 is held or fixed, and the suppression of short circuit and the improvement of the capture of the conductive particles are expected. In addition, the viscosity of the insulating resin layer in the production process of the anisotropic conductive film may be appropriately adjusted by this photocuring. In particular, the photocuring is preferably performed when the ratio (La/D) between the thickness La of the insulating resin layer 2 and the average particle diameter D of the conductive particles 1 is less than 0.6. This is because, even when the layer thickness of the insulating resin layer 2 is thin with respect to the diameter of the conductive particles, the disposition of the conductive particles is more reliably held or fixed in the insulating resin layer 2, and the viscosity of the insulating resin layer 2 is adjusted to suppress a decrease in yield in connection between electronic components using the anisotropic conductive film.

The mixed amount of the photopolymerizable compound in the resin layer is preferably 30% by mass or less, more preferably 10% by mass or less, and still more preferably less than 2% by mass. This is because when the amount of the photopolymerizable compound is excessively large, the thrust of the pushing-in applied at the time of connection increases.

Examples of the thermo-polymerizable composition may include a thermal radical polymerizable acrylate-based composition containing a (meth)acrylate compound and a thermal radical polymerization initiator, and a thermal cationic polymerizable epoxy-based composition containing an epoxy compound and a thermal cationic polymerization initiator. Instead of the thermal cationic polymerizable epoxy-based composition containing the thermal cationic polymerization initiator, a thermal anionic polymerizable epoxy-based composition containing a thermal anionic polymerization initiator may be used. Furthermore, a plurality of types of polymerizable compounds may be used in combination as long as they do not cause any particular problem. Examples of the combination may include a combination of a thermal cationic polymerizable compound and a thermal radical polymerizable compound.

As the (meth)acrylate compound, a conventionally known thermo-polymerizable (meth)acrylate monomer can be used. For example, monofunctional (meth)acrylate-based monomers, bifunctional or more polyfunctional (meth)acrylate-based monomers may be used.

Examples of the thermal radical polymerization initiator may include an organic peroxide, and an azo compound. In particular, an organic peroxide which does not generate nitrogen which causes bubbles may preferably be used.

The amount of the thermal radical polymerization initiator used is preferably 2 to 60 parts by mass, and more preferably 5 to 40 parts by mass, with respect to 100 parts by mass of the (meth)acrylate compound, since too small an amount of the thermal radical polymerization initiator leads to poor curing and too large an amount of the thermal radical polymerization initiator leads to a decrease in product life.

Examples of the epoxy compound may include a bisphenol A type epoxy resin, a bisphenol F type epoxy resin, a novolac type epoxy resin, modified epoxy resins of these, and an alicyclic epoxy resin. Two or more of these resins may be used in combination. In addition to the epoxy compound, an oxetane compound may be used in combination.

As the thermal cationic polymerization initiator, any known thermal cationic polymerization initiator of an epoxy compound may be adopted, and examples thereof used may include an iodonium salt, a sulfonium salt, a phosphonium salt, and a ferrocene, which generate an acid by heat. In particular, an aromatic sulfonium salt which exhibits good latency with respect to temperature may preferably be used.

The amount of the thermal cationic polymerization initiator used is preferably 2 to 60 parts by mass, more preferably 5 to 40 parts by mass, with respect to 100 parts by mass of the epoxy compound, since too small an amount of the thermal cationic polymerization initiator tends to cause poor curing, and too large an amount thereof tends to lower the product life.

The thermo-polymerizable composition preferably contains a film forming resin or a silane coupling agent. Examples of the film forming resin may include a phenoxy resin, an epoxy resin, an unsaturated polyester resin, a saturated polyester resin, a urethane resin, a butadiene resin, a polyimide resin, a polyamide resin, and a polyolefin resin, and two or more of these resins may be used in combination. Of these, a phenoxy resin may preferably be used from the viewpoints of film forming property, processability, and connection reliability. The weight-average molecular weight is preferably 10,000 or more. Examples of the silane coupling agent may include an epoxy-based silane coupling agent, and an acrylic silane coupling agent. These silane coupling agents are primarily alkoxysilane derivatives.

In order to adjust the melt viscosity, the thermo-polymerizable composition may contain an insulating filler in addition to the filler 1 described above. Examples of the insulating filler may include silica powder, and alumina powder. A fine filler having an insulating filler particle diameter of 20 to 1000 nm is preferable, and the mixed amount is preferably 5 to 50 parts by mass with respect to 100 parts by mass of a thermo-polymerizable compound (photopolymerizable compound) such as an epoxy compound. The insulating filler to be contained separately from the filler 1 is preferably used when the use application of the filler-containing film is an anisotropic conductive film, but may not be insulative depending on the use application, and may contain, for example, a conductive minute filler. When the filler-containing film is configured as an anisotropic conductive film, the resin layer forming the filler distributed layer may appropriately contain a finer insulating filler (so-called nanofiller) different from the filler 1, as necessary.

The filler-containing film of the present invention may contain a filling agent, a softener, an accelerator, an antiaging agent, a colorant (pigment, dye), an organic solvent, an ion catcher agent, or the like, in addition to the above-mentioned insulating or conductive filler.

(Layer Thickness of Resin Layer)

In the anisotropic conductive film, which is one aspect of the filler-containing film of the present invention, the ratio (La/D) between the layer thickness La of the resin layer 2 and the particle diameter D of the fillers 1 is 0.3 or more and 1.3 or less. Herein, the particle diameter D of the fillers 1 means the average particle diameter thereof. If the layer thickness La of the resin layer 2 is too large and this ratio becomes excessively large, the fillers are hardly pressed against the terminal at the time of anisotropic conductive connection, and are easily flowed by the resin flow. Therefore, the fillers are easily displaced, and the filler capturing properties at the terminal are lowered. In addition, the thrust required for the pressing jig to press the fillers against the terminal also increases, which hinders the low-pressure mounting. On the contrary, when the layer thickness La of the resin layer 2 is too small and the ratio becomes excessively small, it becomes difficult to maintain the fillers 1 in a predetermined disposition by the resin layer 2. In particular, from the viewpoint of maintaining the disposition of the fillers 1 in the resin layer 2, the ratio (La/D) is preferably greater than 0.3, more preferably greater than or equal to 0.4. Further, from the viewpoint of suppressing excessive resin flow at the time of anisotropic conductive connection and realizing low-pressure mounting, the ratio is preferably 1 or less. From the viewpoints of facilitating the exposure of the fillers 1 from the resin layer 2 and facilitating the low-pressure mounting, the ratio (La/D) is preferably less than 1, more preferably less than 0.6, and further more preferably less than or equal to 0.5. In this case, the fillers 1 may penetrate the resin layer 2.

(Embedded State of Fillers in Resin Layer)

Figure 2:
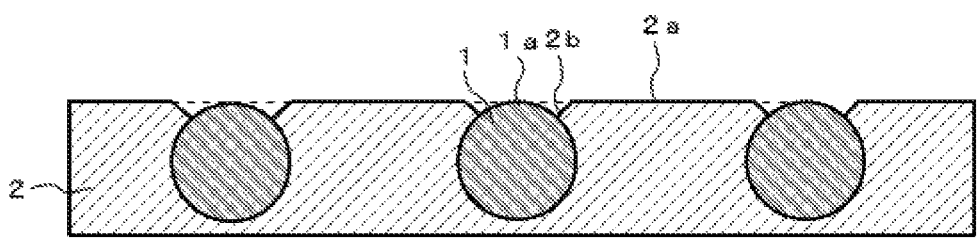
FIG. 2 is a cross-sectional view of a filler-containing film (an anisotropic conductive film which is one aspect thereof) 10B of an embodiment.
Figure 3:
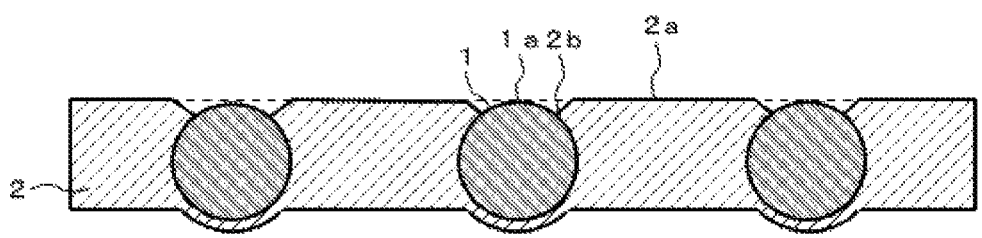
FIG. 3 is a cross-sectional view of a filler-containing film (an anisotropic conductive film which is one aspect thereof) 10C of an embodiment.

In the filler-containing film (anisotropic conductive film which is one embodiment) 10A of the present embodiment, the fillers 1 are embedded so that the fillers 1 protrude from one surface of the resin layer 2 with an embedded rate (Lb/D) of 30% or more and 100% or less as shown in FIG. 1B. In addition, examples of the filler-containing film of the present invention may include an aspect in which, as in the filler-containing film (anisotropic conductive film which is one aspect) 10B shown in FIG. 2, the fillers 1 are embedded at or near the embedded rate of 100% so that the fillers 1 are exposed from one surface of the resin layer 2 and the film surface and the tops 1a of the fillers 1 are substantially flush with each other; an aspect in which, as in the case of the filler-containing film (anisotropic conductive film which is one aspect) 10C shown in FIG. 3, the fillers 1 are substantially flush with the film surface on one surface of the resin layer 2 and are projected from the film surface without being exposed on the opposite surface thereof; an aspect in which, as in the case of the filler-containing film (anisotropic conductive film which is one aspect) 10D shown in FIG. 4, the fillers 1 are exposed while being embedded below the film surface on one surface of the resin layer 2 and are projected from the film surface without being exposed on the opposite surface; an aspect in which, as in the case of the filler-containing film (anisotropic conductive film which is one aspect) 10E shown in FIG. 5, the fillers 1 are exposed at one point of the top 1a thereof from the resin layer 2 without concaves formed on the surface of the resin layer 2; and an aspect in which, as in the case of the filler-containing film (anisotropic conductive film which is one aspect) 10F shown in FIG. 6, the fillers 1 are not exposed from the resin layer 2 but the resin layer 2 has concaves (portions recessed from the surface of the surrounding resin layer) 2c on the surface of the resin layer 2 immediately above the fillers 1.

Figure 4:
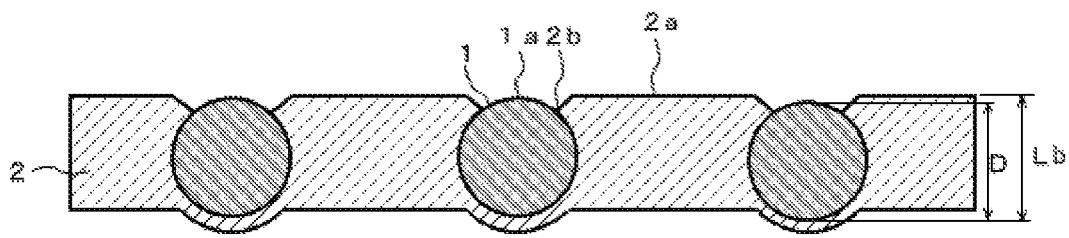
FIG. 4 is a cross-sectional view of a filler-containing film (an anisotropic conductive film which is one aspect thereof) 10D of an embodiment.
Figure 5:
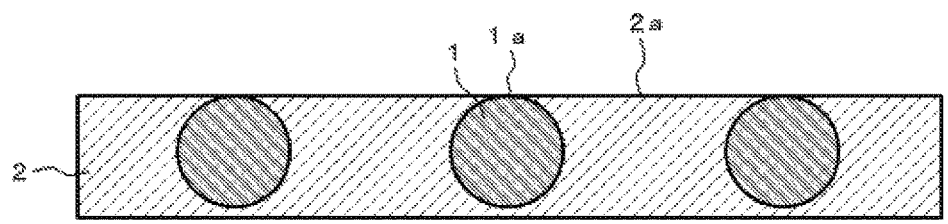
FIG. 5 is a cross-sectional view of a filler-containing film (an anisotropic conductive film which is one aspect thereof) 10E of an embodiment.

The embedded rate used herein is a ratio (Lb/D) of an embedded amount Lb to a particle diameter D of the fillers 1 when a distance between the surface 2a of the resin layer 2 in which the fillers 1 are embedded (the surface on the side where the fillers 1 are exposed among the front and back surfaces of the resin layer 2, or the surface close to the filler when the fillers are completely embedded in the resin layer 2), in particular, the tangent plane 2p to a central portion of the resin layer surface between the adjacent fillers and the deepest portion of the filler 1 is defined as the embedded amount Lb (FIG. 1B). Accordingly, as shown in FIG. 4, if the filler 1 is embedded deeper than the film surface, the embedded rate (Lb/D) is greater than 100%, and for example, 105% or less can be mentioned. If fillers 1 just pass through the resin layer 2, the embedded rate (Lb/D) is 100%.

When the embedded rate is preferably 30% or more, the fillers 1 can be maintained in a predetermined particle distributed state or in a predetermined arrangement by the resin layer 2. When the embedded rate is 100% or less, preferably 70% or less, and more preferably less than 60%, if the filler-containing film is configured as an anisotropic conductive film, the amount of the resin which acts to flow the fillers at the time of anisotropic conductive connection to lower the capture rate among the resins constituting the resin layer 2 can be reduced. In addition, since the unnecessary resin layer 2 is reduced in amount, the fillers are easily pushed in. On the other hand, when the embedded rate is less than 30%, the fillers 1 tend to roll on the resin layer 2 at the time of anisotropic conductive connection, and thus, it is difficult to maintain the fillers 1 at predetermined positions, so that the capture rate is lowered. When the embedded rate exceeds 100% and the fillers are completely embedded in the resin layer 2, the fillers 1 are flowed by the resin flow of the resin layer 2 at the time of anisotropic conductive connection, the capturing properties are lowered, and short circuit may occur. Further, the effect of improving the characteristics can be expected by equalizing the degree to which the fillers are exposed from the resin layer 2. As an example, when the performance of an optical film depends on a filler, if the dispersibility (independence) in a plan view and the degree of exposure have regularity equal to or more than a certain level, it is inferred that the improvement of the performance and the stability of the quality can be obtained more than those obtained by applying a simply kneaded binder or the like.

In the present invention, the numerical value of the embedded rate (Lb/D) means that 99% or more, preferably 99.9% or more, more preferably 99.99% or more of the total number of fillers contained in the anisotropic conductive film which is one aspect of the filler-containing film satisfies the numerical value of the embedded rate (Lb/D). Therefore, the embedded rate of 30% or more and 100% or less means that the embedded rate of 99% or more, preferably 99.9% or more, more preferably 99.99% or more of the total number of fillers contained in a filler-containing film such as an anisotropic conductive film or the like is 30% or more and 100% or less. Since the embedded rates (Lb/D) of all the fillers are uniform in this manner, the load of the pressing force is uniformly applied to the fillers in the anisotropic conductive films, so that the filler capturing state at the terminals becomes favorable, and the conduction reliability is improved. Even in the case where the filler-containing film is simply adhered, it can be inferred that the effect as described above can be obtained more than that obtained by applying a simply kneaded binder or the like.

In the filler-containing films 10B (FIG. 2), 10C (FIG. 3), and 10E (FIG. 5) described above, the film surface of the resin layer 2 and the tops 1a of the fillers 1 are approximately flush with each other, thereby providing the advantage that the amount of the resin in the film thickness direction around the individual fillers 1 at the time of anisotropic conductive connection becomes uniform as compared to the filler-containing film 10A (FIG. 1B) in which the fillers 1 protrude from the resin layer 2 when the filler-containing film is configured as an anisotropic conductive film. In particular, in the case of the filler-containing film 10E (FIG. 5), when the fillers are pushed into the terminal or bump at the time of anisotropic conductive connection, the fillers 1 are difficult to move since the amount of the resin around the top 1a of the filler 1 is uniform, so that it is expected that the capturing properties are enhanced, and short circuit can be suppressed. This is effective particularly when the fine pitch is adopted or the inter-bump space is narrow.

In addition, in the filler-containing films 10A (FIG. 1B), 10B (FIG. 2), 10C (FIG. 3), and 10D (FIG. 4) described above, the portions of the surface in which the fillers 1 are embedded and with which the fillers 1 are in contact and in the vicinity thereof among the front and back surfaces of the resin layer 2 are concave relative to the surrounding flat surface 2a. In the case where the fillers 1 are pushed into the resin layer 2 at the time of production of the filler-containing film, the concaves 2b may be formed when the viscosity of the resin layer at the time of pushing-in is within the above-mentioned preferable viscosity range. When the filler-containing film is configured as an anisotropic conductive film, the presence of the concaves 2b on the surface of the resin layer 2 reduces the resistance received from the resin layer 2 due to the flattening of the fillers 1 that occurs when the fillers 1 are held between the terminals at the time of anisotropic conductive connection, as compared to the absence of a concave 2b. Thus, the effect of facilitating the uniform pushing-in of the fillers at the terminals can be expected. As described above, the filler-containing film has specificity in the state of the filler and the resin as compared with a film obtained by applying a simply kneaded binder. Therefore, it can be expected that the film has characteristics of performance and quality (performance improvement, quality stabilization, etc.).

In addition, the concaves 2c in the filler-containing film (anisotropic conductive film which is one aspect thereof) 10F (FIG. 6) are also formed when the fillers 1 are pushed into the resin layer 2 at the time of production of the filler-containing film, and when the resin layer 2 at the time of pushing-in falls within the above-mentioned preferable viscosity range. When the filler-containing film is configured as an anisotropic conductive film, the formation of the concaves 2c on the surface of the resin layer 2 facilitates the concentration of the pressure to the fillers 1 at the time of the anisotropic conductive connection as compared to the absence of a concave 2c. Thus, the effect of facilitating the uniform pushing-in of the fillers at the terminals can be expected. The difference between the filler-containing film and that obtained by applying a simply kneaded binder and the like is the same as described above.

In addition, the presence of the concaves 2b and 2c on the surface of the resin layer 2 can be confirmed by observing a cross section of a filler-containing film with a scanning electron microscope, and can also be confirmed by surface field observation with a scanning electron microscope. The concaves can also be observed by an optical microscope or a metallurgical microscope.

<Modified Aspect>

Figure 7:
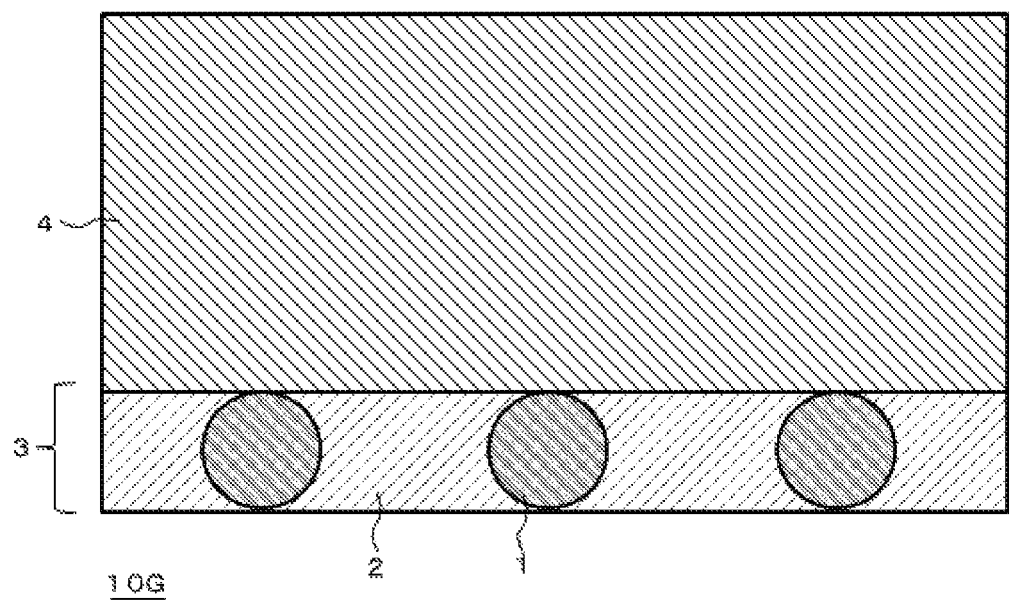
FIG. 7 is a cross-sectional view of a filler-containing film (an anisotropic conductive film which is one aspect thereof) 10G of an embodiment.
Figure 8:
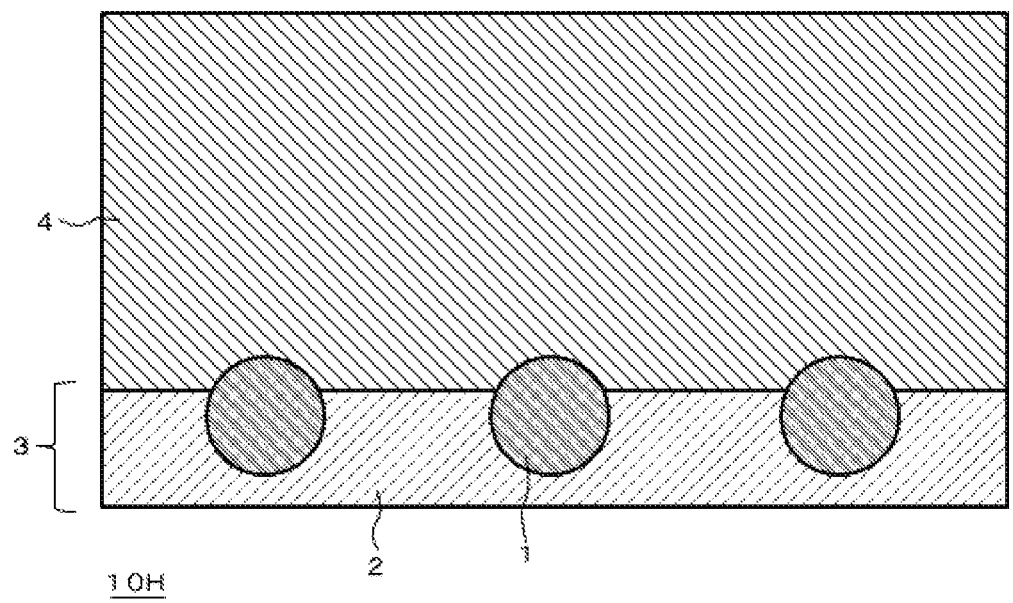
FIG. 8 is a cross-sectional view of a filler-containing film (an anisotropic conductive film which is one aspect thereof) 10H of an embodiment.
Figure 9:
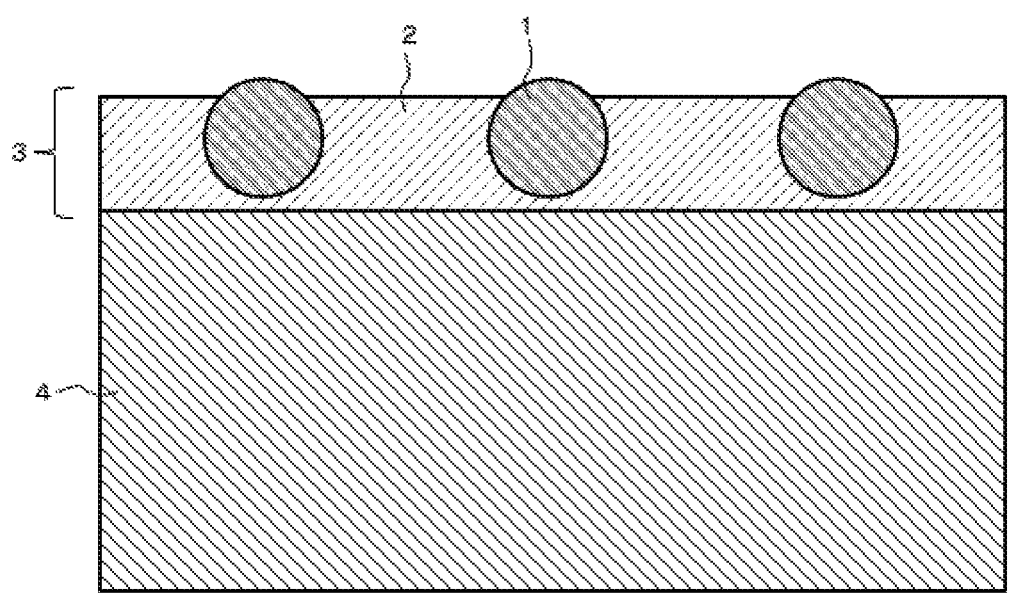
FIG. 9 is a cross-sectional view of a filler-containing film (an anisotropic conductive film which is one aspect thereof) 10I of an embodiment.

As the filler-containing film of the present invention, a second resin layer 4 preferably having a minimum melt viscosity lower than that of the resin constituting the resin layer 2 can be laminated on the filler distributed layer 3 (FIG. 7 to FIG. 9). Since the second resin layer 4 has a lower minimum melt viscosity than that of the resin layer 2, when the filler-containing film is configured as an anisotropic conductive film, space formed by terminals such as bumps of electronic components at the time of anisotropic conductive connection is filled, and the adhesion between the opposing electronic components can be improved. That is, in order to enable low-pressure mounting of the electronic component using the anisotropic conductive film and to improve the particle capturing properties for the fillers 1 by suppressing the resin flow of the resin layer 2 at the time of anisotropic conductive connection, it is desirable to increase the viscosity of the resin layer 2 and to reduce the thickness of the resin layer 2 as long as the fillers 1 do not cause positional displacement. If the thickness of the resin layer 2 is excessively reduced, however, there is a concern that the adhesiveness may be lowered because the amount of the resin for adhering the opposing electronic components to each other may be short. On the other hand, provision of the second resin layer 4 having a viscosity lower than that of the resin layer 2 at the time of anisotropic conductive connection can improve the adhesiveness between electronic components, and can make it difficult to hinder the fillers from being held or pushed in by the terminals due to the high fluidity of the second resin layer 4.

When the second resin layer 4 is laminated on the filler distributed layer 3, it is preferable that the second resin layer 4 is adhered to the electronic component to be pressed by a tool (the resin layer 2 is adhered to the electronic component to be placed on the stage) regardless of whether or not the second resin layer 4 is on the surface on which the concave 2b is formed. By doing so, it is possible to avoid undesired movement of the fillers, and to improve the capturing properties. It is inferred that the same is true even when the film is configured other than the anisotropic conductive film.

The larger the difference in the minimum melt viscosity ratio between the resin layer 2 and the second resin layer 4 becomes, the more easily the space formed by the electrodes and bumps of the electronic component is to be filled with the second resin layer 4. Thus, the adhesion between the electronic components can be improved. Further, the larger the difference becomes, the less the relative amount of movement of the resin present in the filler distributed layer 3 becomes. Thus, the fillers 1 between the terminals are hardly flowed by the resin flow, so that the filler capturing properties at the terminals are improved. In practical use, the minimum melt viscosity ratio of the resin layer 2 to the second resin layer 4 is preferably 2 or more, more preferably 5 or more, and still more preferably 8 or more. On the other hand, if this ratio is too large, when a long-length filler-containing film is wound into a wound body, there is a concern that the resin may run off or be blocked, and therefore, it is practically preferable that the ratio be 15 or less. More specifically, the preferable minimum melt viscosity of the second resin layer 4 satisfies the above-described ratio and is 3000 Pa·s or less, more preferably 2000 Pa·s or less, and particularly 100 to 2000 Pa·s.

The second resin layer 4 can be formed by adjusting the viscosity in the same resin composition as that for the resin layer 2.

The layer thickness of the second resin layer 4 is preferably 4 to 20 μm. Alternatively, it is preferably 1 to 8 times the particle diameter of the filler.

The minimum melt viscosity of the entire filler-containing film 10G, 10H, or 10I obtained by combining the resin layer 2 and the second resin layer 4 is preferably 200 to 4000 Pa·s.

As a specific lamination aspect of the second resin layer 4, for example, the second resin layer 4 can be laminated on one surface of the filler distributed layer 3 as in the case of the filler-containing film 10G shown in FIG. 7. In this case, the relationship between the particle diameter D of the fillers 1 and the layer thickness La of the resin layer 2 is 0.3 or more and 1.3 or less in La/D, as described above.

When the fillers 1 protrude from one surface of the resin layer 2 as in the case of the filler-containing film 10H shown in FIG. 8, the second resin layer 4 may be laminated on the protruding surface so that the fillers 1 bite the second resin layer 4. If the embedded rate of the filler 1 is 95% or less, it is preferable to laminate the resin layer 4 in this manner, and more preferably if the embedded rate is 90% or less.

As in the case of the filler-containing film 10I shown in FIG. 9, the second resin layer 4 may be laminated on the surface opposite to the surface of the resin layer 2 in which the fillers 1 are embedded.

(Third Resin Layer)

A third resin layer may be provided on the opposite side to the second resin layer 4 with the resin layer 2 interposed therebetween. The third resin layer can function as a tack layer. Like the second resin layer 4, the third resin layer may be provided to fill a space formed by electrodes and bumps of an electronic component.

The resin composition, viscosity, and thickness of the third resin layer may be the same as or different from those of the second resin layer. The minimum melt viscosity of the filler-containing film obtained by combining the resin layer 2, the second resin layer 4, and the third resin layer is not particularly limited, but may be 200 to 4000 Pa·s.

(Other Lamination Aspects)

Depending on the use application of the filler-containing film, a plurality of filler distributed layers may be laminated. A layer containing no filler such as the second resin layer may be interposed between the laminated filler distributed layers. Further, the second resin layer or the third resin layer may be provided in the outermost layer.

<Method for Producing Filler-Containing Film>

In the filler-containing film of the present invention formed of a single layer of the filler distributed layer 3, for example, the fillers 1 are held on the surface of the resin layer 2 in a predetermined arrangement, and are pushed into the resin layer 2 by a flat plate or a roller.

Here, the embedded amount Lb of the filler 1 in the resin layer 2 can be adjusted by the pressing pressure, temperature, etc. when the fillers 1 are pushed in. The presence or absence, shape, and depth of the concave 2b, or 2c can be adjusted by the viscosity of the resin layer 2, pushing speed, temperature, etc. when the fillers are pushed in.

The technique of holding the fillers 1 in the resin layer 2 is not particularly limited, and for example, a transfer mold is used to hold the fillers 1 in the resin layer 2. As the transfer mold, for example, those obtained by forming openings in a transfer mold material of an inorganic material such as silicon, various ceramics, glass, or a metal such as stainless steel, or an organic material such as various resins by a known opening forming method such as a photolithography method can be used. The transfer mold may have a plate shape, a roll shape, or the like.

When the filler-containing film is configured as an anisotropic conductive film, it is preferable that the anisotropic conductive film, which is the filler-containing film, be long to some extent in order to economically connect electronic components using the anisotropic conductive film. Therefore, the anisotropic conductive film is produced to have a length of preferably 5 m or more, more preferably 10 m or more, and more preferably 25 m or more. On the other hand, if the anisotropic conductive film is excessively long, it becomes impossible to use a conventional connection device used when producing an electronic component using the anisotropic conductive film, and handling performance also deteriorates. Therefore, the anisotropic conductive film is produced to have a length of preferably 5000 m or less, more preferably 1000 m or less, and still more preferably 500 m or less. Such a long body of the anisotropic conductive film is preferably a wound body wound around a winding core from the viewpoint of excellent handleability. For the same or similar reasons, the upper limit is considered to be the same for use applications other than the anisotropic conductive film.

<Method of Using Filler-Containing Film>

The filler-containing film of the present invention can be used in the same manner as the conventional filler-containing film, and the article is not particularly limited as long as the filler-containing film can be bonded thereto. The filler-containing film can be bonded to a variety of articles according to the use application by pressure bonding, preferably by thermocompression bonding. Light irradiation may be used at the time of bonding, or heat and light may be used in combination. For example, when the resin layer of the filler-containing film has sufficient adhesion to the article to which the filler-containing film is bonded, a film bonded body in which the filler-containing film is bonded to the surface of a single article can be obtained by lightly pressing the resin layer of the filler-containing film against the article. In this case, the surface of the article is not limited to a flat surface, and may have unevenness or may be bent as a whole. If the article has a film shape or a flat plate shape, a pressure-bonding roller may be used to bond the filler-containing film to the articles. This also allows the filler of the filler-containing film to be directly connected to the article.

Furthermore, a filler-containing film may be interposed between two opposing articles, and the opposing two articles may be connected by a thermocompression roller or a pressure-bonding tool, and the fillers may be held between the articles. Alternatively, the filler-containing film may be held between the articles such that the fillers and the articles are not in direct contact with each other.

In particular, when the filler-containing film is an anisotropic conductive film, the filler-containing film can be preferably used for anisotropic conductive connection between a first electronic component such as an IC chip, an IC module, or an FPC and a second electronic component such as an FPC, a glass substrate, a plastic substrate, a rigid substrate, or a ceramic substrate via the anisotropic conductive film using a thermocompression tool. An IC chip or a wafer may be stacked using an anisotropic conductive film to be multilayered. The electronic components to be connected by the anisotropic conductive film of the present invention are not limited to the electronic components described above. The anisotropic conductive film can be used for various electronic components that have been diversified in recent years.

Accordingly, the present invention encompasses a connection structure in which the filler-containing film of the present invention is bonded to various articles by pressure bonding, and a method for producing the same. In particular, in the case where the filler-containing film is an anisotropic conductive film, the present invention also encompasses a method for producing a connection structure in which electronic components are anisotropically conductively connected to each other by using the anisotropic conductive film, and a connection structure obtained thereby, that is, a connection structure in which the electronic components are anisotropically conductively connected to each other by the anisotropic conductive film of the present invention.

As the method for connecting an electronic component using an anisotropic conductive film, when the anisotropic conductive film is composed of a single layer of the conductive particle distributed layer 3, the anisotropic conductive film is temporarily pressure bonded to the second electronic component such as various substrates from the side where the conductive particles 1 of the anisotropic conductive film are embedded in the surface, and the first electronic component such as an IC chip or the like is attached to the anisotropic conductive film on the side where the conductive particles 1 are not embedded in the surface of the temporarily pressure bonded anisotropic conductive film, followed by thermocompression bonding to produce a connection structure. In the case where the insulating resin layer of the anisotropic conductive film contains not only a thermal polymerization initiator and a thermo-polymerizable compound but also a photopolymerization initiator and a photopolymerizable compound (which may be the same as the thermo-polymerizable compound), a pressure bonding method using both light and heat may be used. In this manner, undesired movement of the conductive particles can be minimized. Further, the side where the conductive particles are not embedded may be temporarily bonded to the second electronic component. The anisotropic conductive film may be temporarily bonded to the first electronic component instead of the second electronic component.

In the case where the anisotropic conductive film is formed from a laminate of the conductive particle distributed layer 3 and the second insulating resin layer 4, the conductive particle distributed layer 3 is temporarily bonded to the second electronic component such as various substrates to be temporarily pressure bonded, and the first electronic component such as an IC chip is aligned and mounted on the second insulating resin layer 4 side of the temporarily pressure bonded anisotropic conductive film and thermocompression bonded. The anisotropic conductive film may be temporarily bonded to the first electronic component from the second insulating resin layer 4 side thereof. In addition, the anisotropic conductive film may be temporarily bonded to the first electronic component from the conductive particle distributed layer 3 side thereof for use.

EXAMPLE

A specific description will now be given of the anisotropic conductive film which is one aspect of the filler-containing film of the present invention by way of examples.

Examples 1 to 5 and Comparative Example 1

(1) Production of Anisotropic Conductive Film

A resin composition for forming an insulating resin layer, which forms a conductive particle distributed layer, and a resin composition for forming a second insulating resin layer were prepared by the formulations shown in Table 1, respectively. The minimum melt viscosity of the insulating resin layer was 3000 Pa·s or more, and the ratio of the minimum melt viscosity of the insulating resin layer to the minimum melt viscosity of the second insulating resin layer was 2 or more.

The resin composition for forming the insulating resin layer (high viscosity resin layer) was applied onto a PET film having a film thickness of 50 μm by a bar coater, and dried in an oven at 80° C. for 5 minutes, so that an insulating resin layer having a thickness shown in Table 2 was formed on the PET film. In the same manner, the second insulating resin layer was formed on the PET film with the thickness shown in Table 2.

TABLE 1

| | Formulation | Parts by mass |
|---|---|---|
| Insulating Resin Layer (High Viscosity Resin Layer) | Phenoxy Resin (Nippon Steel & Sumikin Chemical Co., Ltd., YP-50) | 40 |
| | Silica Filler (Nippon Aerosil Co., Ltd., R805) | 25 |
| | Liquid Epoxy Resin (Mitsubishi Chemical Co., Ltd., jER828) | 30 |
| | Silane Coupling Agent (Shin-Etsu Chemical Co., Ltd., KBM-403) | 2 |
| | Thermal Cationic Polymerization Initiator (Sanshin Chemical Industry Co., Ltd., SI-60L) | 3 |
| Second Insulating Resin Layer | Phenoxy Resin (Nippon Steel & Sumikin Chemical Co., Ltd., YP-50) | 40 |
| | Silica Filler (Nippon Aerosil Co., Ltd., R805) | 5 |
| | Liquid Epoxy Resin (Mitsubishi Chemical Co., Ltd., jER828) | 50 |
| | Silane Coupling Agent (Shin-Etsu Chemical Co., Ltd., KBM-403) | 2 |
| | Thermal Cationic Polymerization Initiator (Sanshin Chemical Industry Co., Ltd., SI-60L) | 3 |

On the other hand, a mold was produced such that conductive particles (average particle diameter: 3.5 μm) 1 were arranged in a hexagonal lattice arrangement as shown in FIG. 1A in a plan view, the inter-particle distances of the conductive particles were 3.5 μm, and the density of number was 23600 particles/mm². Pellets of a known transparent resin were melted and poured into this mold, and cooled and solidified to form a resin mold having concave portions in the arrangement pattern shown in FIG. 1A.

Conductive particles (manufactured by Sekisui Chemical Co., Ltd., Ni/Au plated resin particles, average particle diameter of 3.5 μm) were filled in the concave portions of the resin mold, and the above-described insulating resin layer was placed thereover and bonded thereto by pressing at 60° C. and 0.5 MPa. Then, the insulating resin layer was peeled off from the mold, and the conductive particles on the insulating resin layer were pushed into the insulating resin layer under the pressing conditions of 60 to 70° C., and 0.5 MPa to form the conductive particle distributed layer (Examples 1 to 5).

In Comparative Example 1, the conductive particles were mixed with the resin composition forming the insulating resin layer shown in Table 1 to form an insulating resin layer (density of number: 50,000 particles/mm$^2$) in which the conductive particles were randomly dispersed in a single layer.

The embedded rate (Lb/D) and embedded state of the conductive particles in the insulating resin layer (presence or absence of exposure of the conductive particles from the insulating resin layer) of each of the examples and the comparative examples were observed by a metallurgical microscope, and the area occupancy rate of the conductive particles was determined. In addition, the proportion by number of conductive particles present in a non-contact state with each other with respect to the entire conductive particles (the non-contact ratio of the conductive particles) was determined by observing 10 points of 50 μm×50 μm with a metallurgical microscope. The results are shown in Table 2.

Further, a second insulating resin layer was laminated on the surface of the conductive particle distributed layer to produce a two-layer type anisotropic conductive film (Examples 1 to 5, Comparative Example 1). In this case, in Examples 1 to 5, the second insulating resin layer was laminated on the surface of the conductive particle distributed layer on the side where the conductive particles had been pushed in.

(a) Initial Conduction Resistance

An evaluation IC and a glass substrate described below were heated and pressed through an anisotropic conductive film at 180° C. and 60 MPa, and for 5 seconds to obtain a connection article for evaluation. At this time, the thrust required for the pressing jig was 125 N.

Evaluation IC:

| | |
|---|---|
| Outer shape | 1.8 × 20.0 mm |
| Thickness | 0.5 mm |

Bump specification: size 30×85 μm, inter-bump distance 50 μm, and bump height 15 μm Glass Substrate Glass material: 1737F manufactured by Corning Incorporated

| | |
|---|---|
| Outer shape | 30 × 50 mm |
| Thickness | 0.5 mm |
| Electrode | ITO wiring |

The conduction resistance of the obtained evaluation connection article was measured by a four-terminal method. The initial conduction resistance is preferably 2Ω or less in practical use, and more preferably 0.6Ω or less.

(b) Conduction Reliability

The connection article for evaluation obtained in (a) was placed in a constant temperature bath at a temperature of 85°

TABLE 2

| | | Example 1 | Example 2 | Example 3 | Example 4 | Example 5 | Comparative Example 1 |
|---|---|---|---|---|---|---|---|
| Disposition of Conductive Particles | | Hexagonal Lattice | Hexagonal Lattice | Hexagonal Lattice | Hexagonal Lattice | Hexagonal Lattice | Random |
| Density of Number of Particles (particles/mm$^2$) | | 23600 | 23600 | 23600 | 23600 | 23600 | 50000 |
| Particle Diameter (D) (μm) | | 35 | 35 | 35 | 35 | 35 | 35 |
| Area Occupancy Rate of Conductive Particles (%) | | 23 | 23 | 23 | 23 | 23 | 25< |
| Thickness (μm) | Insulating Resin Layer (La) (Conductive Particle Distributed layer) | 1.0 | 1.8 | 3.5 | 4.0 | 4.5 | 4.6 |
| | Second Insulating Resin Layer | 17.0 | 16.2 | 14.5 | 14.0 | 13.5 | 13.4 |
| | Total | 18 | 18 | 18 | 18 | 18 | 18 |
| La/D | | 0.3 | 0.5 | 1.0 | 1.1 | 1.3 | 1.3 |
| Embedded Rate Lb/D | | 0.3 | 0.5 | 1.0 | 1.0 | 1.0 | 0.9-1.3 |
| Embedded State of Conductive Particles | | Conductive particles are exposed from insulating resin layer. | Conductive particles are exposed from insulating resin layer. | Conductive particles are exposed from insulating resin layer. | Insulating resin layer surface and top of conductive particles are flush with each other. | Insulating resin layer surface and top of conductive particles are flush with each other. | Mixed state of exposed conductive particles from insulating resin layer and embedded conductive particles in insulating resin layer |
| Non-contact Rate of Conductive Particles (%) | | 98% or more | 98% or more | 98% or more | 98% or more | 98% or more | Less than 60% |
| Conduction Resistance (Ω) | Initial | 0.2 | 0.2 | 0.2 | 0.4 | 0.4 | 0.5 |
| | Reliability 500 hr | 1.0 | 0.2 | 0.3 | 2.8 | 3.5 | 6.4 |
| Average Particle Capturing Number (particles) | | 13 | 29 | 28 | 28 | 28 | 28 |
| Short Circuit Rate | | A | A | A | A | A | C |

(2) Evaluation

The anisotropic conductive films of the examples and the comparative examples produced in (1) were cut to have a sufficient area for connection, and (a) initial conduction resistance, (b) conduction reliability, (c) average particle capturing number, and (d) short circuit rate were evaluated in the following manner. Table 2 shows the results.

C. and a humidity of 85% RH for 500 hours, and then the conduction resistance was measured in the same manner as the initial conduction resistance. The conduction resistance is preferably 5Ω or less in practical use.

(c) Average Particle Capturing Number

The same IC for evaluation as in (a) and the ITO pattern glass substrate corresponding to the terminal pattern of the evaluation IC were heated and pressed under the same conditions as in (a), and the capturing number of conductive particles was measured for 100 terminal pairs after heating and pressing, and the average thereof was obtained. The average particle capturing number is preferably 3 or more per terminal for practical use.

(d) Short Circuit Rate

An IC for evaluation of the short circuit rate was used, and an evaluation connection article was obtained in the same manner as the evaluation of (a) the initial conduction resistance, and the number of short circuits of the obtained connection article for evaluation was measured to determine the short circuit rate (i.e., the short-circuit occurrence rate), and the short circuit rate was evaluated according to the following criteria.

IC for evaluation of short circuit rate (Comb teeth TEG (test element group) with a space of 7.5 μm)

| Outer shape | 15 × 13 mm |
|---|---|
| Thickness | 0.5 mm |

Bump specification: size 25×140 μm, inter-bump distance 7.5 μm, and bump height 15 μm Short Circuit Rate Evaluation Criterion A: less than 50 ppm
B: 50 ppm or more and less than 200 ppm
C: 200 ppm or more As can be seen from Table 2, since the anisotropic conductive films of Examples 1 to 5 had the ratio La/D of 0.3 to 1.3 between the layer thickness La of the insulating resin layer 2 and the average particle diameter D of the conductive resin particles, all of the initial conduction resistances, the conduction reliability, and the average particle capturing number were good, and the measured values were stable with little variation. In particular, considering Example 1, it is understood that the La/D was preferably larger than 0.3, and Example 2 having La/D of 0.5 had excellent initial conduction resistances, conduction reliability, and average particle capturing number. It should be noted that the allowable range of 0.3 to 1.3 as a numerical value of the La/D means that the layer thickness of the insulating resin layer 2 may vary from a predetermined thickness at the time of designing as long as the La/D falls within this range, which is advantageous from the viewpoint of production costs of the anisotropic conductive film, particularly when the anisotropic conductive film is long and there is a concern about variations in the layer thickness of the resin layer. In Example 3, similarly to Examples 4 and 5, there were some portions where the insulating resin layer and the conductive particles were flush with each other.

On the other hand, in Comparative Example 1, the density of number of the conductive particles was high, the area occupancy rate exceeded 25%, the thrust by the pressing jig was insufficient, and the conduction reliability deteriorated. The average particle capturing number was highly variable. The short circuit rate was also inferior.

When the pressure was lowered by setting the heating and pressurizing conditions to a temperature of 180° C., a pressure of 30 MPa, and 5 seconds in heating and pressurizing the evaluation IC and the glass substrate to obtain the connection article for evaluation of the initial conduction resistance, the initial conduction resistance was 0.2Ω in Example 1 and Example 2, and 1.2Ω in Comparative Example 1. In addition, when the pressure was raised by setting the heating and pressurizing conditions to a temperature of 180° C., a pressure of 90 MPa, and 5 seconds, the initial conduction resistance of each of Example 1, Example 2, and Comparative Example 1 was 0.2Ω. As a result, in Comparative Example 1, a pressure of 90 MPa was required to achieve an initial conduction resistance of 0.2Ω, but it was found that the required initial conduction resistance could be achieved at 30 MPa in Example 1 and Example 2, and it was confirmed that the anisotropic conductive film of the examples enables low-pressure mounting.

REFERENCE SIGNS LIST 1 filler (conductive particle)
2 resin layer (insulating resin layer)
2b concave (inclination)
2c concave (undulation)
3 filler distributed layer (conductive particle distributed layer)
4 second resin layer
10A, 10B, 10C, 10D, 10E, 10F, 10G, 10H, 10I filler-containing film (anisotropic conductive film which is one aspect thereof)
La layer thickness of resin layer
Lb distance between tangent plane to a central portion of resin layer surface between adjacent fillers and deepest portion of filler
Lc diameter of exposed (immediately above) part of filler at inclination or undulation
Ld maximum diameter of inclination or undulation in resin layer around or immediately above filler
Le maximum depth of inclination in resin layer around filler
Lf maximum depth of undulation in resin layer immediately above filler

The invention claimed is:

1. A filler-containing film comprising a filler distributed layer in which fillers are regularly disposed in a resin layer, wherein:
   an area occupancy rate of the fillers in a plan view is 25% or less,
   a ratio La/D between a layer thickness La of the resin layer and a particle diameter D of the fillers is 0.3 or more and 1.3 or less,
   a proportion of the fillers present in a non-contact state with each other is 95% or more with respect to the entire population of fillers, and
   an undulation is formed in a surface of the resin layer near the fillers with respect to a tangent plane to a central portion of the resin layer surface between adjacent fillers, wherein the surface of the resin layer immediately above the filler in the undulation is below the tangent plane.

2. The filler-containing film according to claim 1, wherein the proportion of the fillers present in a non-contact state with each other is 99.5% or more with respect to the entire population of fillers.

3. The filler-containing film according to claim 1, wherein the fillers are disposed in a hexagonal lattice, a square lattice or a rhombic lattice, and when three fillers are selected in order of proximity to any filler P0, a ratio of a maximum distance to a minimum distance among distances between the three fillers and the filler P0 is 1.2 or less.

4. The filler-containing film according to claim 1, further comprising a second resin layer having a minimum melt viscosity lower than that of the resin layer, wherein the second resin layer is laminated on the filler distributed layer.

5. The filler-containing film according to claim 1, wherein a minimum melt viscosity of the entire resin layer constituting the filler-containing film is 200 to 4000 Pas.

6. The filler-containing film according to claim 1, wherein the filler is a conductive particle, the resin layer of the filler distributed layer is an insulating resin layer, and the filler-containing film is an anisotropic conductive film.

7. The filler-containing film according to claim 1, wherein the number of fillers in plan view is in the range of from 30 to 32,000 fillers/mm$^2$.

8. The filler-containing film according to claim 4, further comprising:
  a third resin layer provided on the filler distributed layer so that the filler distributed layer is disposed between the second and third resin layers.

9. A film bonded body comprising an article bonded to the filler-containing film according to claim 1.

10. A connection structure, comprising a first article and a second article that are connected via the filler-containing film according to claim 1.

11. A method for producing a connection structure comprising pressure bonding a first article and a second article via the filler-containing film according to claim 1.

12. The method for producing the connection structure according to claim 11, wherein:
  the first article is a first electronic component,
  the second article is a second electronic component,
  the filler-containing film is an anisotropic conductive film in which the fillers are conductive particles and the resin layer is an insulating resin layer, and
  the pressure bonding includes thermocompression bonding the first electronic component and the second electronic component via the filler-containing film so that the first electronic component and the second electronic component are anisotropically conductively connected to each other.

13. A connection structure, comprising a first electronic component and a second electronic component that are anisotropically conductively connected via the filler-containing film according to claim 6.

* * * * *